May 26, 1931.  R. J. BRITTAIN, JR  1,807,026
JOURNAL BOX
Filed March 21, 1928  2 Sheets-Sheet 1

Inventor
RICHARD J. BRITTAIN, JR.,
His Attorney.

May 26, 1931.  R. J. BRITTAIN, JR  1,807,026
JOURNAL BOX
Filed March 21, 1928  2 Sheets-Sheet 2

Inventor
RICHARD J. BRITTAIN, JR.,
By
His Attorney.

Patented May 26, 1931

1,807,026

UNITED STATES PATENT OFFICE

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE

JOURNAL BOX

Application filed March 21, 1928. Serial No. 263,301.

This invention relates to journal boxes and comprises all the features of novelty herein disclosed. An object of the invention is to provide improved lubricating circulating means for shaft bearings. Another object is to provide improved devices for distributing the wear occasioned by induced end thrusts of an antifriction bearing and its cage and for conveying lubricant to and from the bearings. To these ends and to improve generally and in detail upon devices of this character, the invention also consists in the various matters hereinafter disclosed and claimed.

The invention, in its broader aspects, is not necessarily limited to the specific embodiment selected for illustration in the accompanying drawings in which Fig. 1 is a longitudinal vertical section of an axle box.

Figure 1:
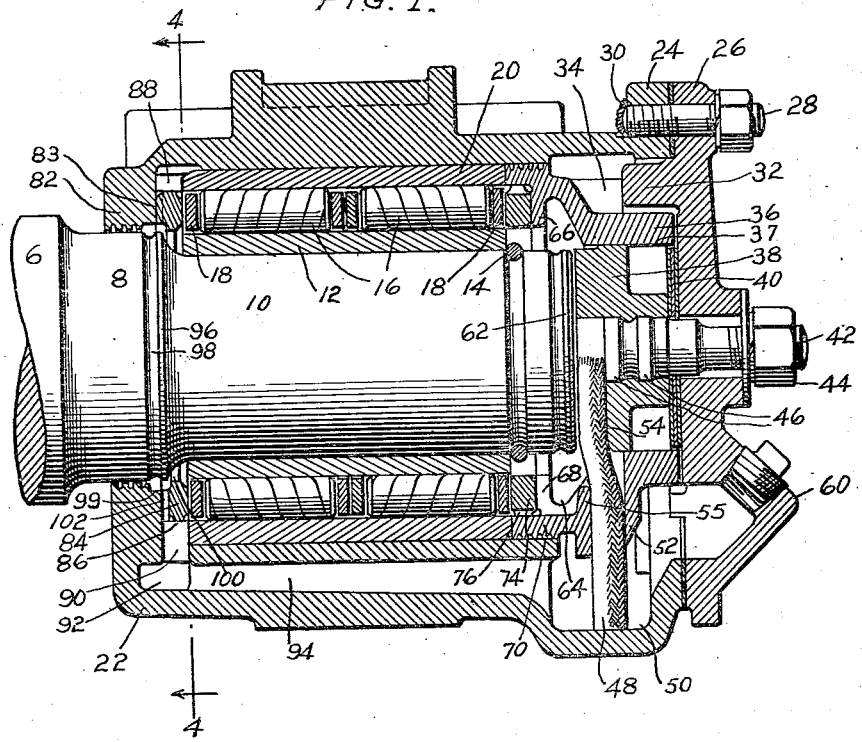

The numeral 6 indicates a shaft or axle having stepped cylindrical surfaces 8 and 10, a sleeve 12 being shrunk or pressed on the surface 10 and held by a split ring 14 which is placed in a groove of the axle. One or more sets of antifriction bearings comprising rollers 16 having end rings or cages 18 are interposed between the sleeve 12 and a lining 20 inserted in the bore of an axle box or casing 22. The box has an out-turned flange 24 to which an end cap 26 is secured by nuts and threaded studs 28, the inner ends of the studs being threaded in and welded to the flange as indicated at 30 to prevent loosening. The end cap has a lug 32 extended inwardly into a slot formed by spaced cheeks 34 near the top of a retaining ring 36 to hold the ring from turning. The retaining ring has a square opening 37 for the square portion of a brass thrust block 38 and spacing plates 40, the block and plates being clamped against the end cap by a bolt 42 and nut 44. The bolt has square collars 46 on which the thrust block is cast to hold the bolt from turning. The inner face of the thrust block opposes the end face of the axle which is lubricated by a wick 48 extending from a lubricant reservoir 50 in the box, through a boss or extension 52 on the retaining ring to a recess 54 in the thrust block. The extension 52, in conjunction with an internal projection 55, forms a deep support or holder for the wick. Oil is admitted to the box through a hollow boss 60 on the end cap and, after lubricating the end of the axle, collects on a rib 62 and is thrown off into an annular groove 64 one wall of which is formed by an inwardly extending abutment flange 66. The lower part of the flange 66 is cut through or notched at 68 to admit lubricant to the bearings as will appear.

Figure 2:
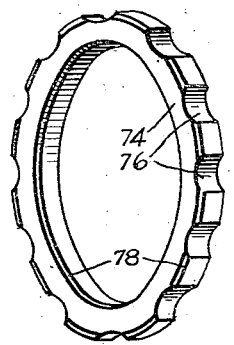
Fig. 2 is a perspective view of the outer floating ring.
Figure 3:
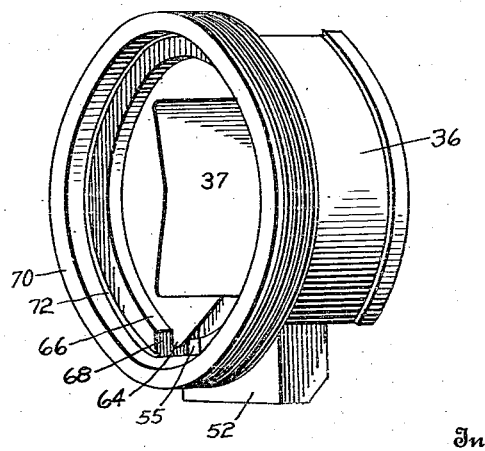
Fig. 3 is a perspective view of the retaining ring.
Figure 4:
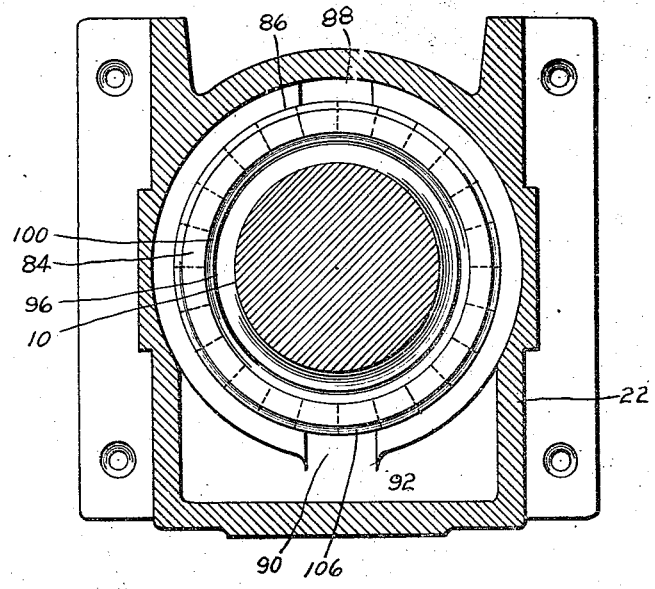
Fig. 4 is a section on the line 4—4 of Fig. 1.
Figure 5:
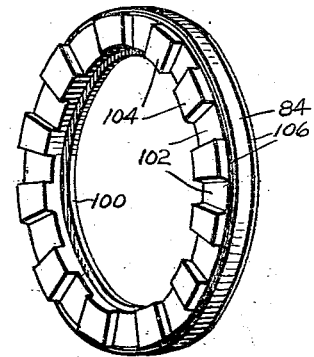
Fig. 5 is a perspective view of the inner floating ring.

The retaining ring 36 has a retaining flange 70 externally provided with grease grooves to make a close joint with the bore of the box and so partition off the axle and bearings from the reservoir. The abutment flange 66 has a groove 72 and between the flange and the cage 18 is interposed a floating ring 74 having its periphery formed with cross slots or scallops 76 to admit oil from the notch 68 to the bearings. The ring is preferably bronze and has its corners chamfered as indicated in detail at 78 in Fig. 2. The ring takes the wear occasioned by induced end thrusts of the bearings, and the cross slots or scallops 76 are spaced near enough together to insure that one or more of them will be in communication with the notch 68 in every position of the ring. The ring is free to rotate or float by rubbing contact with the cage and so will act to distribute wear and to lift oil as it turns on the support afforded by the inner wall of the flange 70. The ring thus carries oil which lubricates its side faces and periphery and this oil must traverse the bearings before returning to the reservoir as will appear.

The inner or rear end of the box has an inwardly extending retaining and abutment flange 82 provided with grease grooves making a close joint with the surface 8 of the axle. Between an abutment surface 83 of the flange and the nearest end ring or cage 18 is interposed a second floating ring 84 supported peripherally by the inner cylindrical surface 86 of a projecting flange or rib which, however, is cut through or notched (top and bottom) at 88 and 90, the lower notch 90 admitting oil to a space 92 from which the oil returns to the reservoir for further circulation through an inclined drain passage or core 94. Oil which may work along the shaft is arrested by a rib 96 and groove 98 and is thrown off into an annular groove 99 formed by a portion of the retaining flange 82 and by an inwardly extending annular flange 100 on the floating ring 84. The oil then passes through one or more radial slots 102 cut in the side of the floating ring, the slots being sufficiently close together to insure one or more being always in communication with the notch 90. The projections 104 between the slots lift sufficient oil to lubricate the side faces and periphery of the ring. The outer corner of the floating ring is chamfered as indicated at 106 to allow oil from the bearings to drop into the slot 90.

I claim:

1. In a device of the character described, a shaft, a journal box, an antifriction bearing having a cage between the shaft and the box, an annular abutment member spaced from the cage and having a surface forming a wall of an oil collecting groove, a floating ring interposed between the abutment member and the cage, and the ring having a series of slots for conveying lubricant through the floating ring from the groove; substantially as described.

2. In a device of the character described, a shaft, a journal box, an antifriction bearing having a cage between the shaft and the box, the shaft having an oil collecting rib, a retaining member having an oil collecting groove to receive oil from the rib, a floating ring interposed between the retaining member and the cage and having a series of spaced slots for communication with the groove; substantially as described.

3. In a device of the character described, a shaft, a journal box, an antifriction bearing having a cage between the shaft and the box, a retaining member having lubricant collecting means near one end of the bearing, and a floating ring interposed between the retaining member and the bearing cage, the floating ring being free to rotate and having slots in the periphery to convey lubricant from the collecting means to the bearings; substantially as described.

4. In a device of the character described, a shaft, a journal box, an antifriction bearing having a cage between the shaft and the box, a retaining member having an oil collecting groove with an abutment flange at the side of the groove, a floating ring interposed between the abutment flange and the cage, the flange having a notch and the floating ring being free to rotate and having spaced slots in the periphery for communication with the notch; substantially as described.

5. In a device of the character described, a shaft, a journal box, an antifriction bearing having a cage between the shaft and the box, a retaining member fitting in the box and having an oil collecting groove with an abutment flange at the side of the groove, a floating ring interposed between the abutment flange and the cage and supported for free rotation by a portion of the retaining member, the abutment flange having a notch and the floating ring having spaced slots in the periphery for communication with the notch; substantially as described.

6. In a device of the character described, a shaft, a journal box, an antifriction bearing having a cage between the shaft and the box, an annular abutment member spaced from the cage, and a floating ring interposed between the abutment member and the cage, and the ring having a series of radial slots formed in the side thereof; substantially as described.

7. In a device of the character described, a shaft, a journal box, an antifriction bearing having a cage between the shaft and the box, the shaft having an oil collecting rib, a retaining member having an oil collecting groove to receive oil from the rib, a floating ring interposed between the retaining member and the cage, the retaining member having a supporting flange surrounding the floating ring and supporting the latter for rotation, the supporting flange having a notch and the floating ring having a series of spaced slots in one side for communication with the notch; substantially as described.

In testimony whereof I hereunto affix my signature.

RICHARD J. BRITTAIN, Jr.